United States Patent [19]

Schofield

[11] 4,017,939
[45] Apr. 19, 1977

[54] DOOR STOP
[75] Inventor: Minnie Schofield, St. Paul, Minn.
[73] Assignee: The Raymond Lee Organization, Inc., New York, N.Y.; a part interest
[22] Filed: Apr. 12, 1976
[21] Appl. No.: 676,315
[52] U.S. Cl. .................................. 16/82; 428/310; 428/313; 292/343
[51] Int. Cl.² ........................ B32B 3/26; E05F 5/02
[58] Field of Search ........ 16/82, 86 R, 86 A, 86 B; 428/310, 313, 315, 159; 292/343

[56] References Cited
UNITED STATES PATENTS

| 1,845,829 | 2/1932 | Carnal | 292/343 |
| 3,499,819 | 3/1970 | Lewis | 428/313 |
| 3,647,607 | 3/1972 | Hillers | 428/159 |
| 3,706,112 | 12/1972 | Newell | 16/82 |

Primary Examiner—William J. Van Balen
Attorney, Agent, or Firm—Howard I. Podell

[57] ABSTRACT

A door stop which may be inserted between a door and the floor to hold the door in a given position. The device is formed with an aluminum sheet metal base to which foam rubber or plastic foam material is bonded. A flexible plastic cover sheet is fastened on top of the foam material.

4 Claims, 3 Drawing Figures

DOOR STOP

SUMMARY OF THE INVENTION

My invention is a portable door stop adaptable for inserting between the floor and the bottom of a door. The device is formed of an aluminum base plate to which foam rubber is bonded. A flexible plastic cover or plastic foam material sheet is bonded to the top of the foam material.

An advantage of my invention is that this portable door stop may be readily inserted under a door to hold an opened door in a given position.

BRIEF DESCRIPTION OF THE DRAWING

The objects and features of the invention may be understood with reference to the following detailed description of an illustrative embodiment of the invention, taken together with the accompanying drawing in which.

DESCRIPTION OF THE PREFERRED EMBODIMENT

Figure 1:
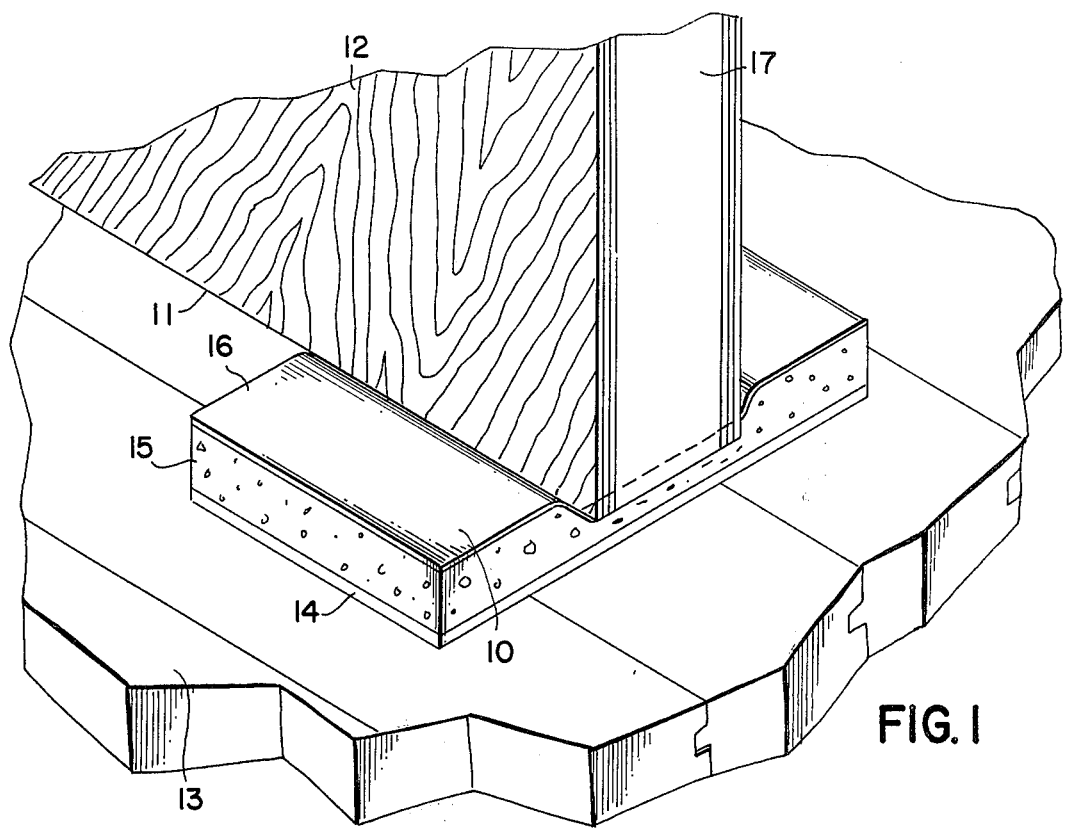
FIG. 1 illustrates a perspective view of the invention in use.
Figure 2:
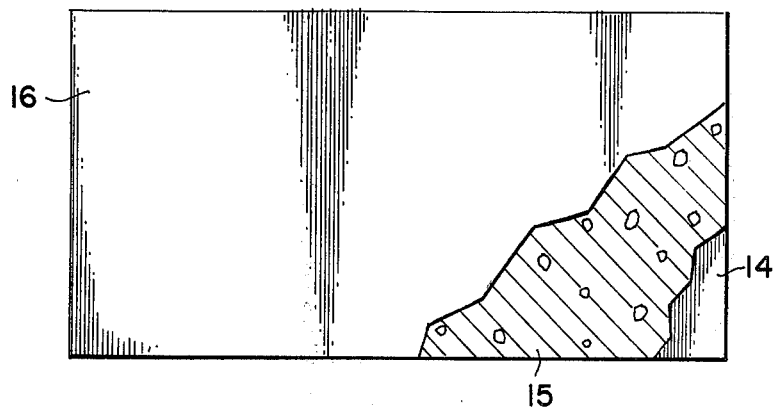
FIG. 2 illustrates a plan view of the invention.
Figure 3:
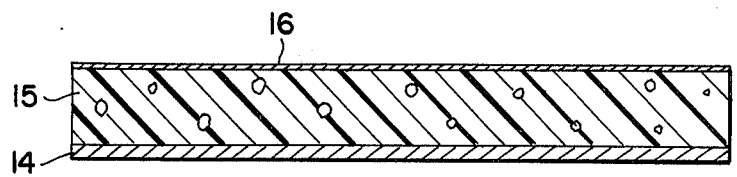
FIG. 3 illustrates a sectional view of the invention.

Turning now descriptively to the drawing, in which similar reference characters denote similar elements throughout the several views, FIG. 1 shows door stop 10 inserted between the bottom edge 11 of a conventional door 12 and the top of a floor 13. As shown in FIGS. 1-3, the base 14 of the door stop 10 is formed of a metal sheet, preferably an aluminum alloy. Foam rubber 15 or plastic foam material is bonded to base 14 and to flexible plastic cover sheet 16 so that the device 10 may be squeezed under the edge 11 of open door 12 to restrict movement of the door.

The foam filler material 15 is preferably of a soft consistency to permit use over a wide range of spacing between the bottom edge 11 of a door 12 and the top surface of the floor 13 or a carpet lying on the floor 13.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A door stop device adaptable for fixing an open door in a specific position when squeezed between the bottom edge of the door and the underlying floor surface, in the form of a laminar structure comprising a base metal plate, a cover sheet of flexible sheeting, together with a section of soft foam material retained between the base plate and the cover sheet.

2. The combination as recited in claim 1 in which the base plate is formed of aluminum sheeting.

3. The combination as recited in claim 1 in which the filler material is formed of foam rubber material.

4. The combination as recited in claim 3 in which the filler material is bonded to the base plate and the cover sheet.

* * * * *